Jan. 25, 1949.  S. E. BOURNE  2,459,865
SHOPPER'S COMBINATION CARRIER AND CONVEYANCE
Filed May 4, 1946
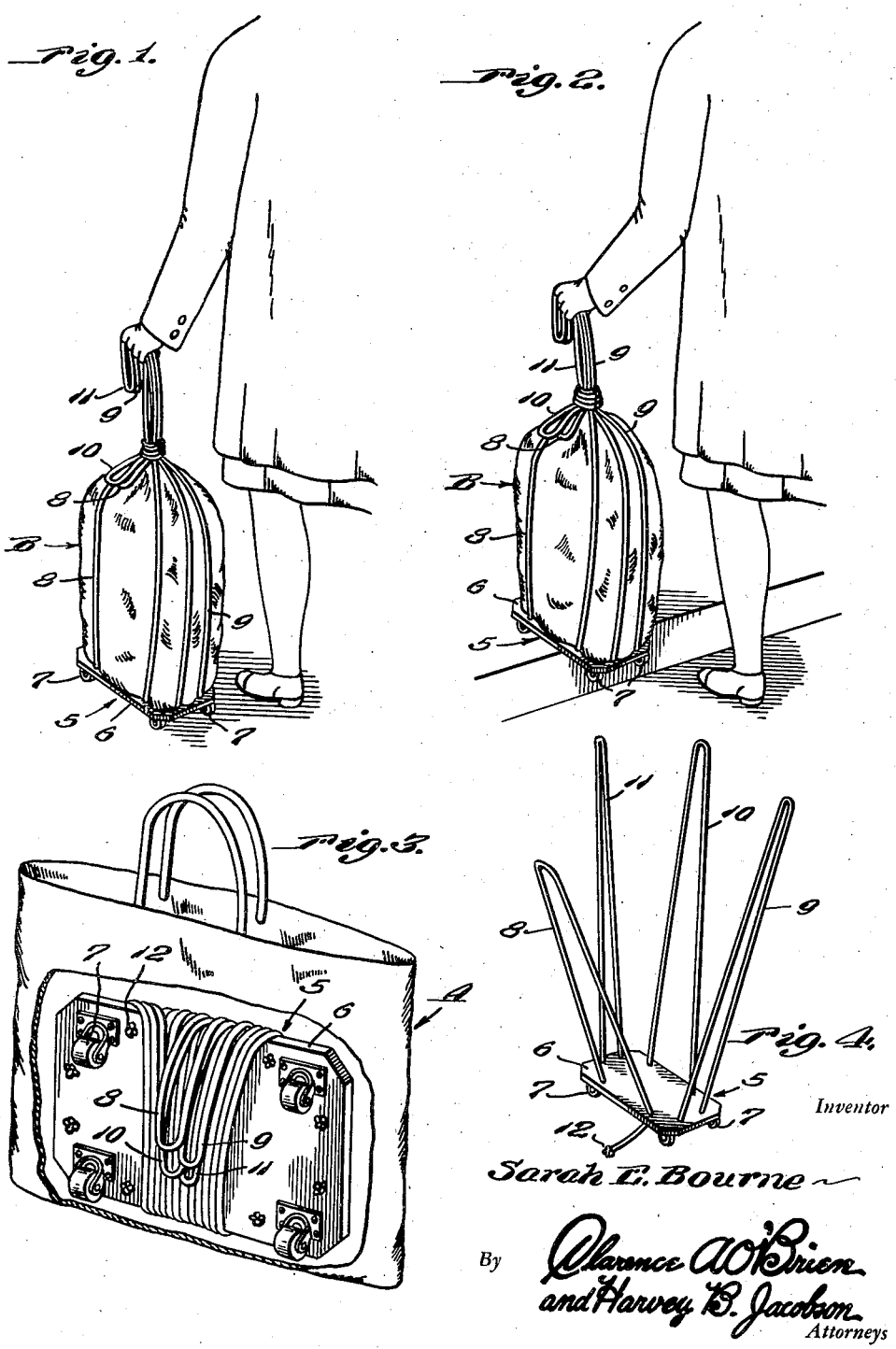
Inventor
Sarah E. Bourne
By Clarence A. O'Brien
and Harvey B. Jacobson
Attorneys Patented Jan. 25, 1949

2,459,865

UNITED STATES PATENT OFFICE 2,459,865

SHOPPER'S COMBINATION CARRIER AND CONVEYANCE

Sarah E. Bourne, Mount Rainier, Md.

Application May 4, 1946, Serial No. 667,397

2 Claims. (Cl. 280—36)

The present invention relates to a novel and improved shopper's article carrier and conveyance combined for conveniently handling and transporting heavy packages, parcels, baskets, shopping bags, and similar loads.

More particularly, the invention comprises a small hand-sized caster-equipped platform or base provided with a plurality of flexible, looped ropes, the latter constructed and arranged for tying and holding the bundle or load on said base, for lifting, and also for towing the thus loaded platform along on a pavement or equivalent traction surface.

One object of the invention, as is evident from the drawings and preceding general statements, is to provide a shopper with simple and reliable means for effectively toting groceries and the like from a store to her home, the same being such as to permit the trip to be made by rolling the roller-equipped means for the entire journey, or rolling it from the store to a parked automobile, and then conveniently and bodily lifting and placing it into the latter to be transported, in an obvious manner.

Another object of the invention is to provide a roller and rope-equipped platform carriage of the type described, the platform and rollers being sufficiently small to be handily carried under one's arm, or conveniently placed in a shopping bag and thus carried to the store for subsequent load handling and transporting purposes.

Another object of the invention is to provide a carrier of the type shown and described in which the aforementioned looped ropes are arranged around the four marginal edges of the roller-equipped platform, said ropes being sufficiently long as to allow same to be tied in various ways, this in a manner to temporarily harness the load for both (1) tractable rolling and (2) lifting and carrying purposes.

Other objects, features and advantages of the invention will become more readily apparent from the following description and the accompanying illustrative drawings.

In the drawings, wherein like numerals are employed to edsignate like parts throughout the views:

Figure 1 is a perspective view of a shopper's package and article carrier-conveyance constructed in accordance with the principles of the invention and showing the manner in which the package is tied in place and then towed and wheeled over a surface.

Figure 2 is a view similar to Figure 1, this also in perspective, the same serving to depict the manner in which the carrier, duly loaded, is lifted up and cleared over a curbstone.

Figure 3 is also a perspective view, this showing the manner in which the ropes are loosely wrapped around the carrier, and the structure, as a unit, is inserted in a shopping bag for "going to market," so to speak.

Figure 4 is a perspective view with the package removed, this to bring out the construction and arrangement of looped cords or ropes.

Reference is first had to Figure 4 showing the so-called shopper's carrier with which we are herein concerned. I use the expression "carrier" advisedly, in the belief that it conveys the several purposes and functions of the invention inasmuch as said invention serves not only to bodily lift and carry the load when conditions so require, but supports the load when wheeled along over the surface, as illustrated in Figure 1. It is believed, however, that, generally speaking, the main part of the structure comprises a carriage or conveyance 5, the latter comprising a relatively small board or the like 6, functioning as a platform, and provided on its under-side and at corner portions with swivelly mounted casters or rollers 7. The truck should be light in weight but sufficiently sturdy to serve a multitude of purposes, and this is as understood. In actual size, it may be said to be such as to accommodate, let us say, an ordinary shopping bag of the type indicated at A in Figure 3. It will be evident, however, that the truck 5, so-called, serves to accommodate various loads such as may be referred to as packages, parcels, baskets, and the like. Take, for example, in Figures 1 and 2 I illustrate a package B which may be a comparatively tall bag loaded with groceries or any equivalent container heavily loaded. Also, as shown in Figure 4, the numerals 8, 9, 10 and 11 denote tying, lifting and pulling cords or ropes. These are of proper length and the free ends thereof are passed down through openings in the marginal portions of the platform and are formed into knots 12 for quick assembling and repair purposes. In practice, I contemplate making the individual cords of comparably different colors to facilitate wrapping and tying same in divers manners to fasten the load on the platform. I shall not attempt to explain the different modes in which the looped or free ends of the ropes may be utilized, for users will find many ways of attaining desired results. In Figures 1 and 2, I have shown the free ends of the two side ropes 8 and 10 tied around the untied free ends of the two ropes 9 and 11. This leaves the latter rope-ends free for lifting and wheeling purposes.

Novelty is predicated, as before indicated, on the small, light-weight roller or wheel-equipped carriage or platform having marginally arranged tow and tie cords or ropes susceptible of use in the manner shown in the drawing.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A shopper's package and article carrying and transporting device of the class described, a carrier-truck comprising a relatively small flat board provided on its underside with corner arranged casters, said board being substantially rectangular, and four board lifting, carrying and package tying ropes, each rope being of elongated loop form, the free end portions attached to marginal edge portions of said board, said four such ropes being situated so that there is one for each marginal edge portion of the board.

2. A shopper's carrier-truck for miscellaneous articles and packages of the class described comprising a light-weight relatively small substantially rectangular board, a plurality of surface contacting and transporting casters attached to the underside of said board and cooperating therewith and forming a carrier-truck, the marginal edge portions of said board being provided with pairs of rope holes, a plurality of lifting, tying and carrier ropes, said ropes being individually bent upon themselves intermediate their ends and formed into loops, the free ends of the ropes passing through the rope holes in the board and being tied into knots in a manner to thus anchor the free ends on said board, the looped portions of the ropes being adapted to be wrapped and tied around a package in such a manner as to permit the truck and package to be lifted and carried, in the manner and for the purposes described.

SARAH E. BOURNE.

REFERENCES CITED

The following references are of record in the file of this patent:

UNITED STATES PATENTS

| Number | Name | Date |
|---|---|---|
| 1,547,914 | Herrick | July 28, 1925 |
| 1,561,122 | Stahl | Nov. 10, 1925 |
| 2,132,316 | Newton | Oct. 4, 1938 |

FOREIGN PATENTS

| Number | Country | Date |
|---|---|---|
| 203,991 | Great Britain | Sept. 20, 1923 |
| 206,440 | Great Britain | Nov. 8, 1923 |
| 236,052 | Germany | June 26, 1911 |
| 252,466 | Italy | Mar. 19, 1927 |